(12) United States Patent
Choi et al.

(10) Patent No.: US 8,015,185 B2
(45) Date of Patent: Sep. 6, 2011

(54) METHOD AND SYSTEM FOR DETECTING SEARCH TERMS WHOSE POPULARITY INCREASE RAPIDLY

(75) Inventors: Jae Keol Choi, Seoul (KR); Sun Ho Kim, Seoul (KR); Sang June Moon, Seoul (KR); Joon Ho Lee, Seoul (KR)

(73) Assignee: NHN Corporation, Seongnam-si (KR)

( * ) Notice: Subject to any disclaimer, the term of this patent is extended or adjusted under 35 U.S.C. 154(b) by 476 days.

(21) Appl. No.: 11/584,875

(22) Filed: Oct. 23, 2006

(65) Prior Publication Data

US 2007/0038624 A1 Feb. 15, 2007

Related U.S. Application Data

(63) Continuation of application No. PCT/KR2005/001166, filed on Apr. 22, 2005.

(30) Foreign Application Priority Data

Apr. 23, 2004 (KR) .......... 10-2004-0028146

(51) Int. Cl.
*G06F 7/00* (2006.01)
*G06F 17/30* (2006.01)
(52) U.S. Cl. .......... 707/734; 707/736; 706/20
(58) Field of Classification Search .......... 707/725, 707/734, 736
See application file for complete search history.

(56) References Cited

U.S. PATENT DOCUMENTS

| | | | |
|---|---|---|---|
| 6,269,361 B1 | 7/2001 | Davis et al. | |
| 6,640,218 B1 * | 10/2003 | Golding et al. | 1/1 |
| 6,853,950 B1 * | 2/2005 | O'Reilly et al. | 702/179 |
| 6,978,264 B2 * | 12/2005 | Chandrasekar et al. | 707/3 |
| 7,146,416 B1 * | 12/2006 | Yoo et al. | 709/224 |
| 7,236,953 B1 * | 6/2007 | Cooper et al. | 705/36 R |
| 2002/0184212 A1 * | 12/2002 | Ugai et al. | 707/6 |
| 2003/0009399 A1 * | 1/2003 | Boerner | 705/35 |
| 2003/0149727 A1 * | 8/2003 | Jaschek et al. | 709/206 |
| 2004/0002369 A1 * | 1/2004 | Walker et al. | 463/1 |
| 2004/0243645 A1 * | 12/2004 | Broder et al. | 707/200 |
| 2004/0260688 A1 * | 12/2004 | Gross | 707/3 |

FOREIGN PATENT DOCUMENTS

| | | |
|---|---|---|
| KR | 10-2002-0001295 A | 1/2000 |
| KR | 10-2002-0017863 A | 3/2002 |
| KR | 10-2002-0025142 A | 4/2002 |
| WO | WO 99/48028 | 9/1999 |

OTHER PUBLICATIONS

Steiner, "Exponentially Weighted Moving Average Control Charts with Time Varying Control Limits and Fast Initial Response", Journal of Quality Technology, 1999, vol. 31, pp. 1-23.*

* cited by examiner

*Primary Examiner* — Shahid Alam
*Assistant Examiner* — Dawaune Conyers
(74) *Attorney, Agent, or Firm* — H.C. Park & Associates, PLC

(57) ABSTRACT

The present invention relates to a method and system for detecting a keyword whose number of being inputted from a user terminal is rapidly increased, and more particularly, to a method and system which generate rapid increase standard quotient by using the average and standard deviation for each keyword and compare the rapid increase standard quotient with measured input number in order to detect a keyword whose input number is rapidly increased.

15 Claims, 10 Drawing Sheets

FIG. 3

| KEYWORD | KEYWORD IDENTIFIER (301) | INPUT NUMBER INFORMATION | | | |
|---|---|---|---|---|---|
| | | Day 1 | Day 2 | Day 3 | |
| CHANHO PARK | S12345 | 100 | 200 | 250 | ---- |
| SERI PAK | S21357 | 110 | 150 | 180 | ---- |
| SNOWBOARD | S54095 | 50 | 60 | 500 | ---- |
| REPORD | S66812 | 40 | 30 | 200 | ---- |
| ---- | ---- | ---- | ---- | ---- | ---- |

| KEYWORD | KEYWORD IDENTIFIER | KEYWORD INPUT RANK INFORMATION ||||
|---|---|---|---|---|---|
| | | Day 1 | Day 2 | Day 3 | |
| CHANHO PARK | S12345 | 200TH | 130TH | 120TH | - - - - |
| SERI PAK | S21357 | 150TH | 145TH | 135TH | - - - - |
| SNOWBOARD | S54095 | 900TH | 800TH | 100TH | - - - - |
| REPORT | S66812 | 1000TH | 1100TH | 130TH | - - - - |
| - - - - | - - - - | - - - - | - - - - | - - - - | - - - - |

501

METHOD AND SYSTEM FOR DETECTING SEARCH TERMS WHOSE POPULARITY INCREASE RAPIDLY

CROSS-REFERENCE TO RELATED APPLICATION

This application is a continuation application under 35 U.S.C. §365(c) of International Application No. PCT/KR2005/001166, filed Apr. 22, 2005, designating the United States, which was published in English as WO 2005/114511 A1 on Dec. 1, 2005. This application further claims for the benefit of the earlier filing dates under 35 U.S.C. §365(b) of Korean Patent Application No. 10-2004-0028146 filed Apr. 23, 2004. This application incorporates herein by reference the International Application No. PCT/KR2005/001166 and the Korean Patent Application No. 10-2004-0028146 in their entirety.

TECHNICAL FIELD

The present invention relates to a method and system for detecting a keyword whose number of being inputted from a user terminal is rapidly increased, and more particularly, to a method and system which generate rapid increase standard quotient by using the average and standard deviation for each keyword and compare the rapid increase standard quotient with measured input number in order to detect a keyword whose input number is rapidly increased.

BACKGROUND ART

Generally, when a keyword is inputted by a user, a search service system providing search service provides search result corresponding to the keyword to the user, for example, web sites including the keyword, articles including the keyword, images whose file name includes the keyword.

In the search service system, keywords inputted by users may be various. However, actually, the ratio that 1000 and odd keywords which rank high according to the number of being inputted by users account for is very high and the ratio that other terms account for is very low. That is, high-level search service can be provided to users via customization service that chiefly provides the search result of several high-ranked keywords whose search request number is large.

To analyze these high-ranked keywords, there are a first case of usually high-ranked keywords, for example, "game", "go-stop", and "entertainers" and a second case of keywords belonging to the high-ranked keywords due to rapidly elevated rank in a predetermined period.

Most Internet search service providers provide customized information to users in association with the first case. However, since it is very difficult to recognize and detect keywords whose input number is rapidly increased, Internet search service providers can not properly cope with the second case and recognize after a lot of time passes. In this case, at the moment of time that Internet search service providers recognize and try to cope with the second case, there is no meaning to cope with the second case because the rank of the keywords already fall.

Also, in the second case, a method in which a human discriminates terms that is frequently shown in articles and estimates the terms as rapid increase keywords may be used. However, since detecting the rapid increase keywords by the described method can be performed after the keywords are widely known to public, the detecting is too late. In addition, keywords can not be detected over all fields.

On the other hand, Korean Patent. Publication No. 2001-0086259 discloses an Internet search engine providing high-flyers hit catalog which is the catalog in which web pages whose population is rapidly increased to searchers. The high-flyers hit catalog indicates the catalog of sites which click frequency of users is rapidly increased.

The Internet search engine measures the click number with respect to each site accumulated click number till now with respect to the each site for a predetermined period, computes population change rate of the each site, and provides sites whose population is rapidly increased as the high-flyers hit catalog to the searcher.

However, in case that the Internet search engine is used, since it is detected whether the population of a site is rapidly increased, it can not be detected whether the input number of a keyword is rapidly increased.

After all, though the Internet search engine is used, Internet search service providers still can not detect a keyword belonging to high-ranked keywords whose rank is rapidly elevated in a certain period. Therefore, Internet search service providers can not properly respond and recognize after a fairly long time. Then, customization service that chiefly provides the keywords whose search request number is rapidly increased can not be provided to user in a proper point in time.

Accordingly, a new method for rapidly detecting keywords whose input number is rapidly increased and providing customization service with respect to the keywords to users in order to maximize convenience of users is required.

DISCLOSURE OF INVENTION

Technical Goals

To solve the described problems of a conventional method, the present invention provides a method and system for detecting rapid increase keywords, in which rapid increase standard quotient is generated by using the average and standard deviation for each keyword and the rapid increase standard quotient with measured input number is compared, thereby providing customization service with respect to the rapid increase keywords to users.

The present invention also provides a method and system for detecting rapid increase keywords, in which keywords whose input number is increased rapidly is quickly detected and provided to users, thereby satisfying users who try to quickly receive the result of search using a keyword whose population is rapidly increased.

The present invention also provides a method and system for detecting rapid increase keywords, in which keywords whose input number is increased rapidly is quickly detected and provided to users such that Internet search service providers apply the searched rapid increase keywords to various fields and maximize the profit.

The present invention also provides a method and system for detecting rapid increase keywords, which detect rapid increase keywords by colligating accumulated data over all fields in a certain period, thereby satisfying users who want to receive rapid increase keywords more precisely and in various fields.

Technical Solutions

According to an aspect of the present invention, there is provided a method of detecting a keyword whose input number is rapidly increased, the keyword inputted from a user terminal, the method including: a step of maintaining a database including a keyword identifier and first input number information with respect to a first keyword related to the keyword identifier, wherein the first input number information is generated at each predetermined time interval and recorded in the database; a step of generating average information and standard deviation information with respect to the first input number information for each the first keyword with reference to the database; a step of generating rapid increase standard quotient information for each the first keyword by using the average information and standard deviation information; a step of receiving a second keyword from the user terminal; a step of counting input number at each the time interval for each the second keyword and generating second input number information; a step of comparing the second input number information and the rapid increase standard quotient information; and a step of detecting a third keyword related to third input number information higher than the rapid increase standard quotient information of the second input number information.

According to an aspect of the present invention, the method may further include a step of maintaining a second database including keyword input rank information according to the first input number information, wherein the keyword input rank information is generated at each the time interval and recorded in the second database; a step of calculating input number increase information related to the third input number information with reference to the database; a step of detecting input rank information corresponding to the third input number information with reference to the second database; a step of computing input rank rise information related to the input rank information with reference to the second database; a step of generating standard normal variable information related to the third input number information by using the average information and standard deviation information; a step of generating rapid increase quotient information by using the input number increase information, the input rank information, the input rank rise information, and the standard normal variable information; and a step of generating rapid rise rank information related to the third keyword based on the rapid increase quotient information.

A rapid increase keyword detection system according to the present invention includes a database including a keyword identifier and first input number information with respect to a first keyword related to the keyword identifier; a database management means generating the first input number information at each predetermined time interval and recording in the database; an average/standard deviation information generation means generating average information and standard deviation information with respect to the first input number information for each the first keyword with reference to the database; a rapid increase standard quotient information generation means generating rapid increase standard quotient information for each the first keyword by using the average information and the standard deviation information; a keyword input means receiving a second keyword from the user terminal; a counter means counting input number per the time interval for each the second keyword and generating second input number information; a comparison means comparing the second input number information with the rapid increase standard quotient information; and a keyword detection means detecting a third keyword related to third input number information higher than the rapid increase standard quotient information of the second input number information.

BRIEF DESCRIPTION OF DRAWINGS

FIG. 3 is a diagram illustrating an example of a database in an embodiment of the present invention;

FIG. 5 is a diagram illustrating an example of a second database including keyword input rank information in an embodiment of the present invention;

BEST MODE FOR CARRYING OUT THE INVENTION

Hereinafter, a method and system for detecting rapid increase keywords according to the present invention is described in detail with reference to the attached drawings.

Figure 1:
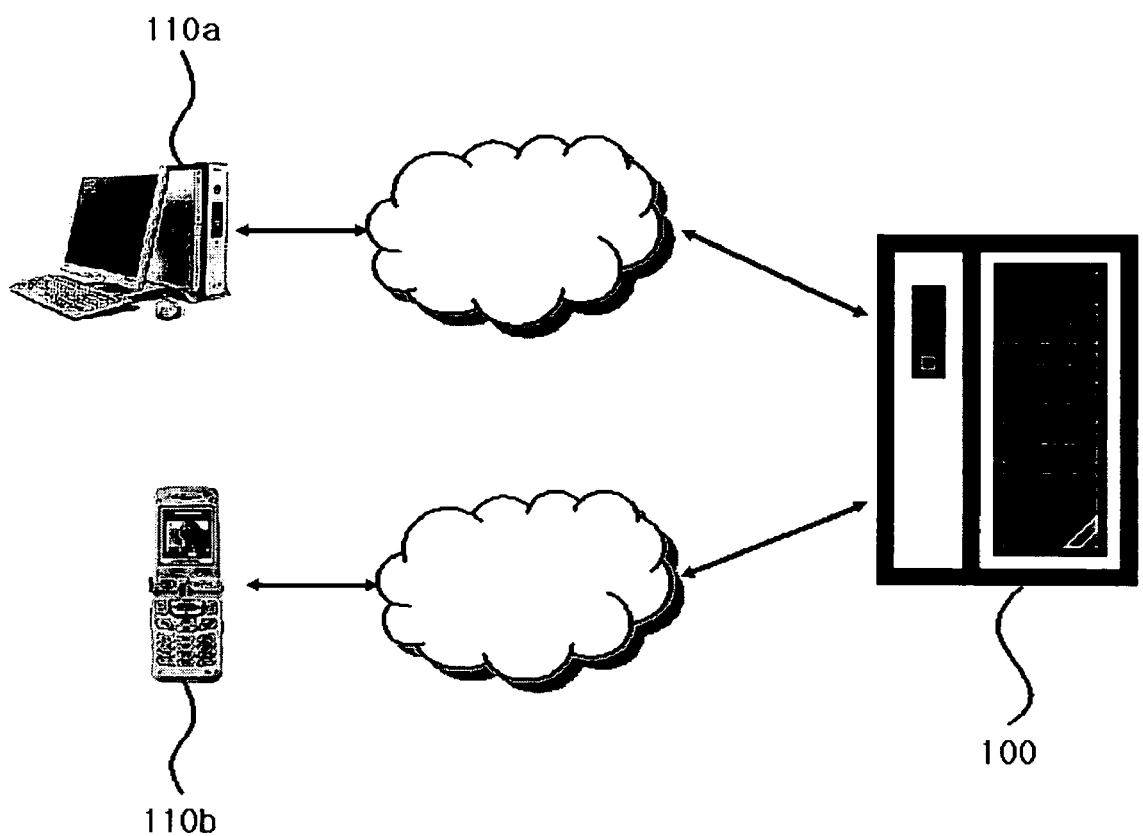
FIG. 1 is a diagram illustrating the network connection of a rapid increase keyword detection system according to an embodiment of the present invention.

FIG. 1 is a diagram illustrating the network connection of a rapid increase keyword detection system according to an embodiment of the present invention. Users access a rapid increase keyword detection system 100 via wired or wireless communication network by using a user terminal 110a or 110b and input a keyword. The rapid increase keyword detection system 100 records the input number with respect to the keyword in a predetermined database and detects rapid increase keywords by analyzing the input number. The rapid increase keyword detection system 100 according to an embodiment of the present invention may generate rank information with respect to the searched term and transmit to the user terminal 110a or 110b. The rapid increase keyword detection system 100 according to the present invention may be managed by being integrated with a search service system. Accordingly, in case that a user is connected to an Internet search service system, the rank information with respect to the searched rapid increase keyword may be provided to the user. Also, in case that a keyword inputted by the user is a detected rapid increase keyword, a previously prepared detailed search result is provided to the user, thereby providing, so called, customization service to the user.

Figure 2:
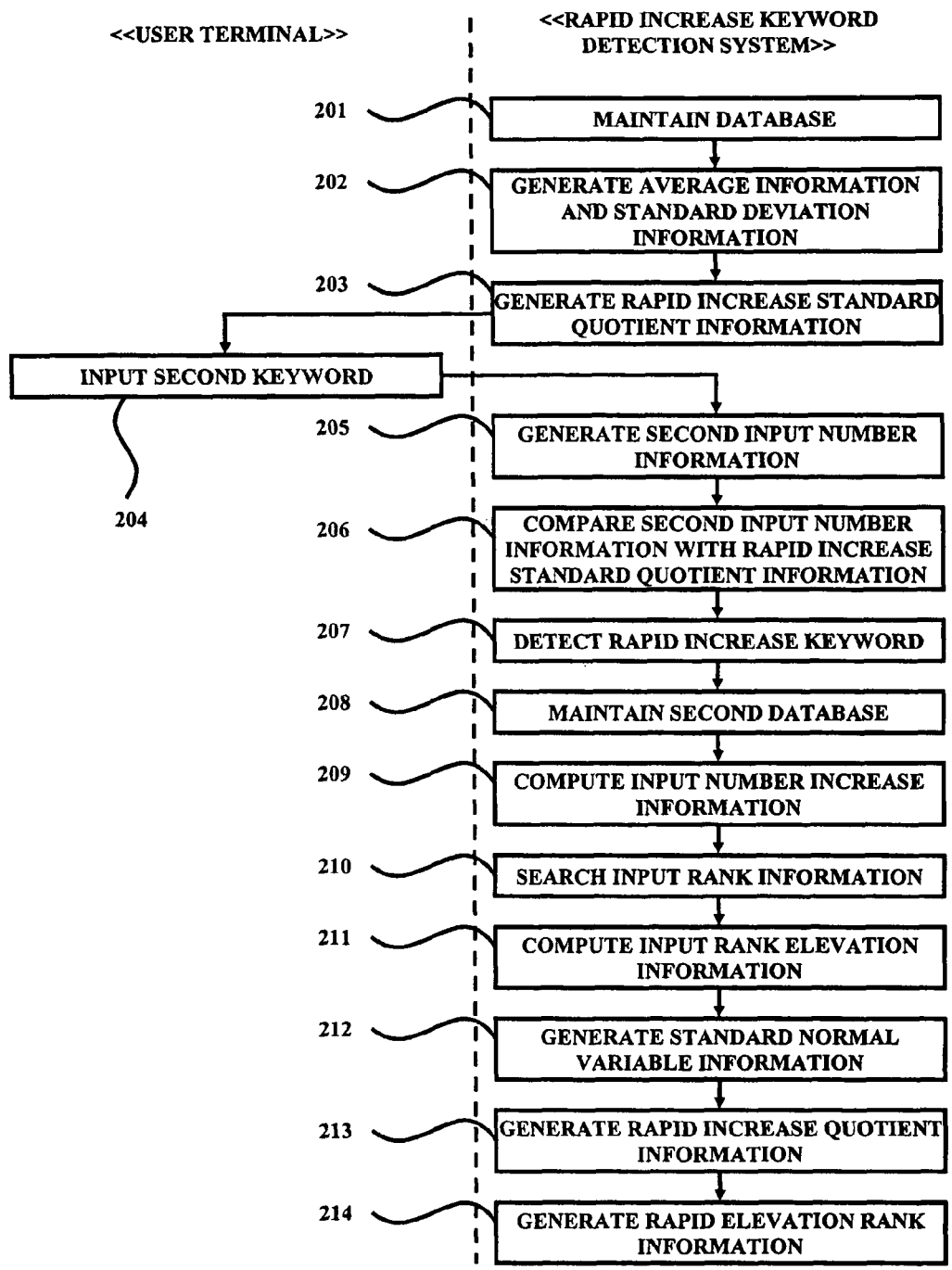
FIG. 2 is a flow chart illustrating a rapid increase keyword detection method according to an embodiment of the present invention.

FIG. 2 is a flow chart illustrating a rapid increase keyword detection method according to an embodiment of the present invention. The rapid increase keyword detection method according to the present invention is provided by a predetermined rapid increase keyword detection system.

In step 201, the rapid increase keyword detection system according to the present invention maintains a database including a keyword identifier and first input number information with respect to a first keyword related to the keyword identifier. The rapid increase keyword detection system generates the first input number information at each predetermined time interval and records in the database.

FIG. 3 is a diagram illustrating an example of the database of an embodiment of the present invention. As shown in FIG. 3, the database may include a keyword identifier 301 and input number information with respect to a keyword related to the keyword identifier 301. Referring to reference numeral 302 shown in FIG. 3, in the database, a keyword identifier with respect to "snowboard" s54095 is recorded and input number information with respect to the "snowboard" 50, 60, 500 are recorded at each predetermined time interval. Though an example of a database in which the time interval is one day is illustrated in FIG. 3, the time interval may be variously determined by a system manager, such as one day, two days, and a week. The system manager may change an existing time interval into a different time interval.

In step 202, the rapid increase keyword detection system generates the average information and standard deviation information with respect to the first input number information for each first keyword. According to an embodiment of the present invention, the rapid increase keyword detection system may generate the average information and standard deviation information at each predetermined time interval. In this case, the time interval may be variously determined by a system manager, such as one month, two months, and three months. The system manager may change an existing time interval into a different time interval. Also, the rapid increase keyword detection system may generate the average information and standard deviation with respect to the first input number information at any time.

According to an embodiment of the present invention, the rapid increase keyword detection system may not consider the data at a point of time of determining whether it is rapid increase keyword in step 202 in which the average information and standard deviation information for each keyword are generated. That is, as described as following, when the rapid increase keyword detection system receives a second keyword from a user terminal and determines whether the second keyword is a rapid increase keyword, the data with respect to the input number of the second keyword may be not considered in generating the average information and standard deviation information. The input number at a point of time corresponding to rapid increase keyword may be widely different from conventional data. If the conventional data is considered, the average information and standard deviation information with respect to the input number of the second keyword are very large. Therefore, it can not be accurately determined whether the input number of the second keyword is rapidly increased at the present time. Accordingly, according to the present embodiment, more accurate rapid increase keyword can be detected.

In step 203, the rapid increase keyword detection system generates rapid increase standard quotient information for each first keyword by using the average information and standard deviation information. The rapid increase standard quotient information is the standard quotient for determining whether the input number of a keyword is rapidly increased.

According to an embodiment of the present invention, the rapid increase keyword detection system may generate the rapid increase standard quotient information by adding a value in which the standard deviation information is multiplied by a predetermined number to the average information in step 203. For example, the predetermined number may be 3. In this case, the rapid increase standard quotient information may be shown as "average+(3*standard deviation)".

According to the present embodiment, in case that a keyword recording a much higher input number than the average input number is shown, the input number may correspond with the rapid increase standard quotient information. Therefore, it is previously prevented that a rapid increase keyword is excessively detected, thereby reducing unnecessary memory consumption and improving the process speed of the rapid increase keyword detection system.

In step 204, the rapid increase keyword detection system receives the second keyword from the user terminal, in step 205, the input number per the time interval is counted for each the second keyword to generate second input number information, and in step 206, the second input number information is compared with the rapid increase standard quotient information.

Also, in step 207, the rapid increase keyword detection system detects a third keyword related to third input number information higher than the rapid increase standard quotient information of the second input number information.

As performed in steps 204 through 207, the rapid increase keyword detection system compares a standard quotient based on a previous data for each keyword with an input number at the present time for each the keyword, thereby detecting a keyword as a rapid increase keyword, which records higher than the standard quotient due to the rapid increase of the input number at the present time.

Figure 4:
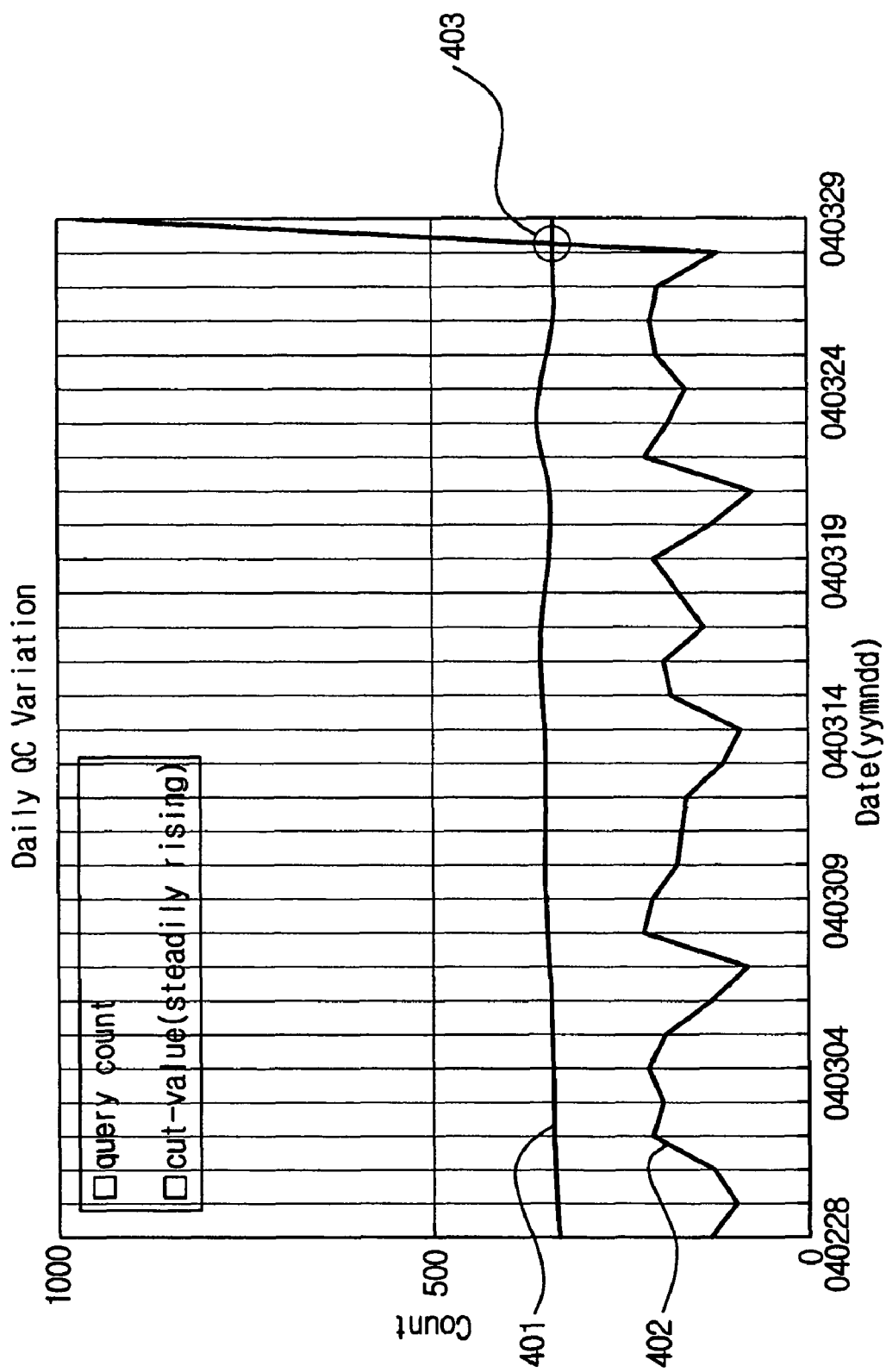
FIG. 4 is a diagram illustrating an example of a graph for detecting rapid increase keyword via comparison with rapid increase standard quotient information in an embodiment of the present invention.

FIG. 4 is a diagram illustrating an example of a graph for detecting a rapid increase keyword by comparing with the rapid increase standard quotient. Referring to FIG. 4, reference numeral 401 indicates rapid increase standard quotient information with respect to a keyword, and reference numeral 402 indicates input number information with respect to the keyword. At a point corresponding to reference numeral 403, the input number information with respect to the keyword exceeds the rapid increase standard quotient information, and the rapid increase keyword detection system detects the keyword as a rapid increase keyword at the point of time.

According to an embodiment of the present invention, in step 207, the rapid increase keyword detection system detects the third keyword limited in case that the third input number information is higher than a predetermined number. That is, the rapid increase keyword detection system may not detect a keyword a rapid increase keyword, whose input number does not reach a certain number, though the input number exceeds the standard quotient. The important reason of detecting a rapid increase keyword is that the rapid increase keyword is quickly grasped in order to provide customization service to a user. Accordingly, with respect to a keyword whose search request number is very small, providing the customization service does not have a great meaning. The rapid increase keyword detection system according to the present embodiment may detect only keywords whose input number is higher than a predetermined number as rapid increase keywords. For example, in case that the time interval is one day, the rapid increase keyword detection system may detect keywords whose input number in one day is higher than 100 as rapid increase keywords.

According to an embodiment of the present invention, a rapid increase keyword detection method in which the rapid increase keyword detection system generates rank information of a detected rapid increase keyword is provided. Hereinafter, the present embodiment is described. The rapid increase keyword detection method according to the present embodiment may further include steps 208 through 214.

In step 208, the rapid increase keyword detection system maintains a second database including keyword input rank information according to the first input number information. The rapid increase keyword detection system generates the keyword input rank information at the time interval and records in the second database.

FIG. 5 is a diagram illustrating an example of the second database including the keyword input rank information in an embodiment of the present invention. As shown in FIG. 5, the second database may include a keyword identifier and keyword rank information according to the input number information related to the keyword identifier. Referring to reference numeral 501 illustrated in FIG. 5, a keyword identifier s54095 related to "snowboard" and input rank information according to input number information related to "snowboard" are recorded at each predetermined time interval in the second database, such as $900^{th}$, $800^{th}$, and $100^{th}$. In FIG. 5, the time interval is one day as FIG. 3 but may be variously determined by a system manager, such as one day, two days, and three days. The system manager may change an existing time interval into a different time interval.

In step 209, the rapid increase keyword detection system computes input number increase information related to the third input number information with reference to the database. Since input number information with respect to keywords generated at each predetermined time interval is recorded in the database as illustrated in FIG. 3, the input number increase information may be computed by calculating a difference between the input number at the present point of time and the input number at the exactly previous point of time. For example, in case that the time interval is one day, the input number with respect to a keyword yesterday is 100 and the input number today is 400, the input number increase information may be computed as 300.

The rapid increase keyword detection system searches input rank information corresponding to the third input number information with reference to the second database in step 210, and computes input rank rise information related to the input rank information with reference to the second database in step 211. Since keyword input rank information generated at each predetermined time interval is recorded in the second database as illustrated in FIG. 5, an input rank corresponding to the input number at the present point of time may be searched. The difference between the searched input rank at the present point of time and the input rank at the exactly previous point of time is computed, thereby computing the input rank rise information. For example, in case that the time interval is one day, if the input number with respect to a keyword today is 400 and the input rank today is $5000^{th}$ and the input rank yesterday is $10000^{th}$, the input rank information may be searched as 5000 and the input rank rise information may be computed as 5000.

In step 212, the rapid increase keyword detection system generates standard normal variable information with respect to the third input number information by using the average information and standard deviation information generated in step 202.

Generally, it is very difficult and complicated to integrate the normal distribution function each time in order to obtain the probability from the range of the value of a random variable. In this case, it is very convenient to obtain a wanted probability after converting the random variable into a standardization variable and generating standard normal distribution. In this case, the standardization variable indicates that the difference between the average and a particular random variable is divided by the standard deviation such as to be converted into a new random variable. The new random variable is called as a standard normal variable. In step 212, the rapid increase keyword detection system may generate the standard normal variable information as described above by using the generated average information and the standard deviation.

In step 213, the rapid increase keyword detection system generates rapid increase quotient information by using the input number increase information, the input rank information, the input rank rise information, and the standard normal variable information.

According to an embodiment of the present invention, the rapid increase keyword detection system may generate multiplication operation value of the input number increase information, the reciprocal of the input rank information, the input rank rise information and the standard normal variable information, and the rapid increase keyword detection system may generate the rapid increase quotient information by using the multiplication operation value. According to the present embodiment, the rapid increase degree of the input number of a keyword may be measured by multiplying the input number increase information, the input rank rise information, and the standard normal variable information, thereby finding a keyword, whose rapid increase degree is higher and more important.

Also, for example, in case that a keyword A whose rank is elevated from $100^{th}$ to $10^{th}$ and a keyword B whose rank is elevated from $10000^{th}$ to $5000^{th}$ exist, it may be generally said that the keyword A records more meaningful input number increase. However, since the rapid increase degree of the keyword B is more largely measured, the keyword B is possible to be ranked higher. Accordingly, the rapid increase keyword detection system according to the present embodiment multiplies the reciprocal of the input rank information together, thereby preventing the illogical result as described above.

Also, according to an embodiment of the present invention, in generating the multiplication operation value of the input number increase information, the reciprocal of the input rank rise information, the input rank rise information, and the standard normal variable information, the rapid increase keyword detection system may generate degree information related to the standard normal variable information and generate the multiplication operation value by using the degree information. In this case, the degree information may be changed according to a predetermined standard. According to the present embodiment, the weight of the standard normal variable information is controlled by using the degree information, thereby reducing the possibility of deriving various illogical results when rapid increase rank information is generated.

According to another embodiment of the present invention, in step 213, the rapid increase keyword detection system may generate the addition operation value of the input number increase information, the input rank rise information, and the standard normal variable information, generate the multiplication operation value of the addition operation value and the reciprocal of the input rank information, and generate the rapid increase quotient information by using the multiplication operation value.

Also, according to the present embodiment, in generating the addition operation value, the rapid increase keyword detection system may use a method in which first weight information related to the input number increase information is generated, second weight information related to the input rank rise information is generated, third weight information related to the standard normal variable information is generated, and the addition operation value can be generated by using the first weight information, the second weight information, and the third weight information.

According to the present embodiment, the rapid increase degree of the input number with respect to a keyword may be measured, thereby finding a keyword whose rapid increase degree is higher and more important. Also, the rapid increase keyword detection system according to the present embodiment multiplies the reciprocal of the input rank information, thereby preventing drawing the illogical result as described above.

According to an embodiment of the present invention, the rapid increase keyword detection system may change the first weight information, the second weight information, or the third weight information according to a predetermined standard. According to the present embodiment, the weight of respective factors is controlled by using the weight information, thereby reducing the possibility of the occurrence of illogical results with various forms, which occurs because any one factor greatly affects the rapid increase quotient information.

According to another embodiment of the present invention, the rapid increase keyword detection system may normalize respectively the input number increase information, the input rank rise information, and the standard normal variable information as a value from 0 to 1. According to the present embodiment, the value of the input number increase information, the input rank rise information, and the standard normal variable information is controlled in a certain range, thereby preventing an illogical result occurring when any one of factors too greatly affects the rapid increase quotient information.

Instep 214, the rapid increase keyword detection system may generate rapid rise rank information with respect to the third keyword based on the rapid increase quotient information. A system manager may provide customization service with respect to keywords whose rapid increase degree is higher and more important to users. Also, the system manager provides the generated rapid rise rank information to users, thereby satisfying the desire of users who wonders what is a keyword whose population is currently rapidly increased.

Figure 6:
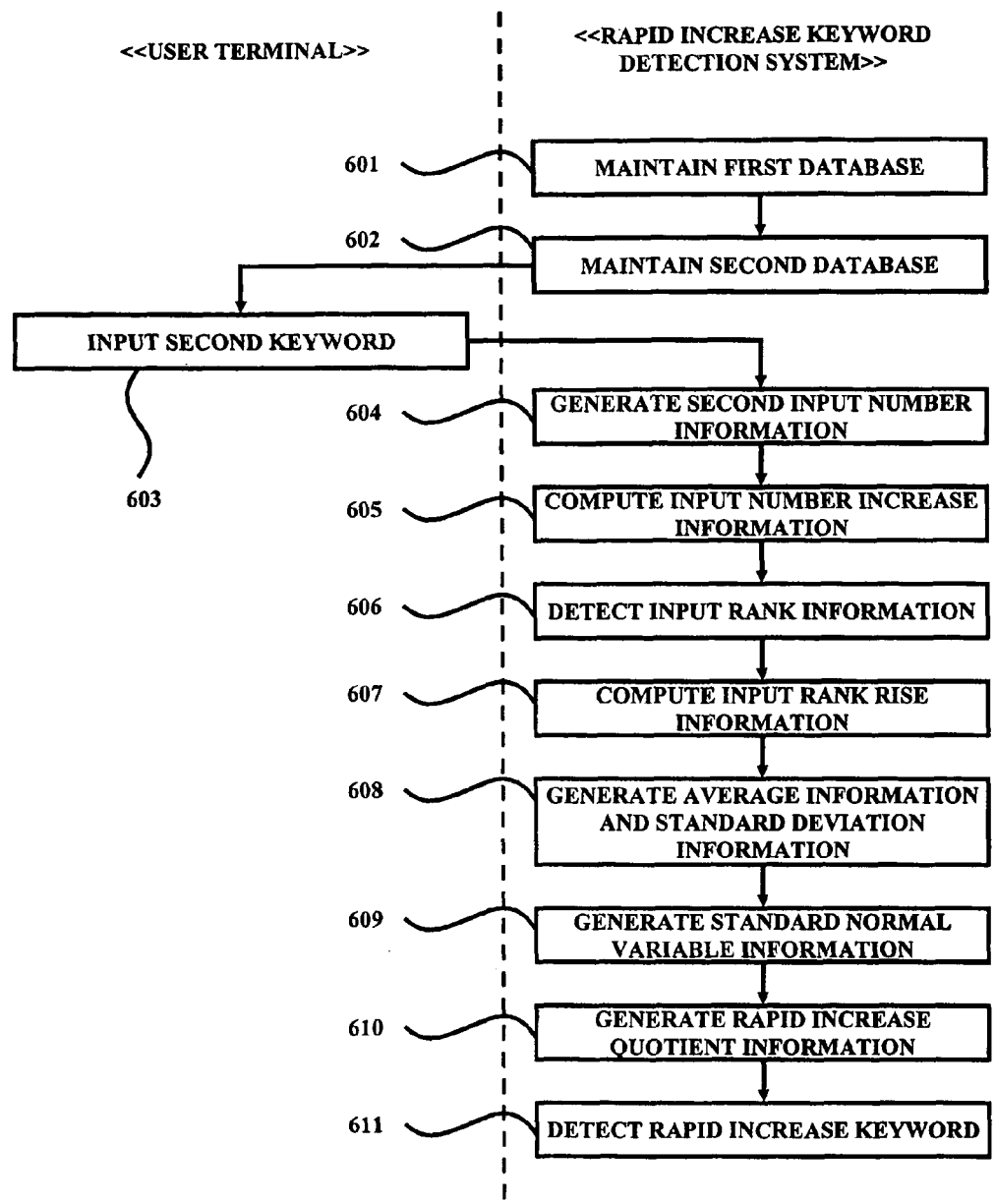
FIG. 6 is a flow chart illustrating a rapid increase keyword detection method according to another embodiment of the present invention.
Figure 7:
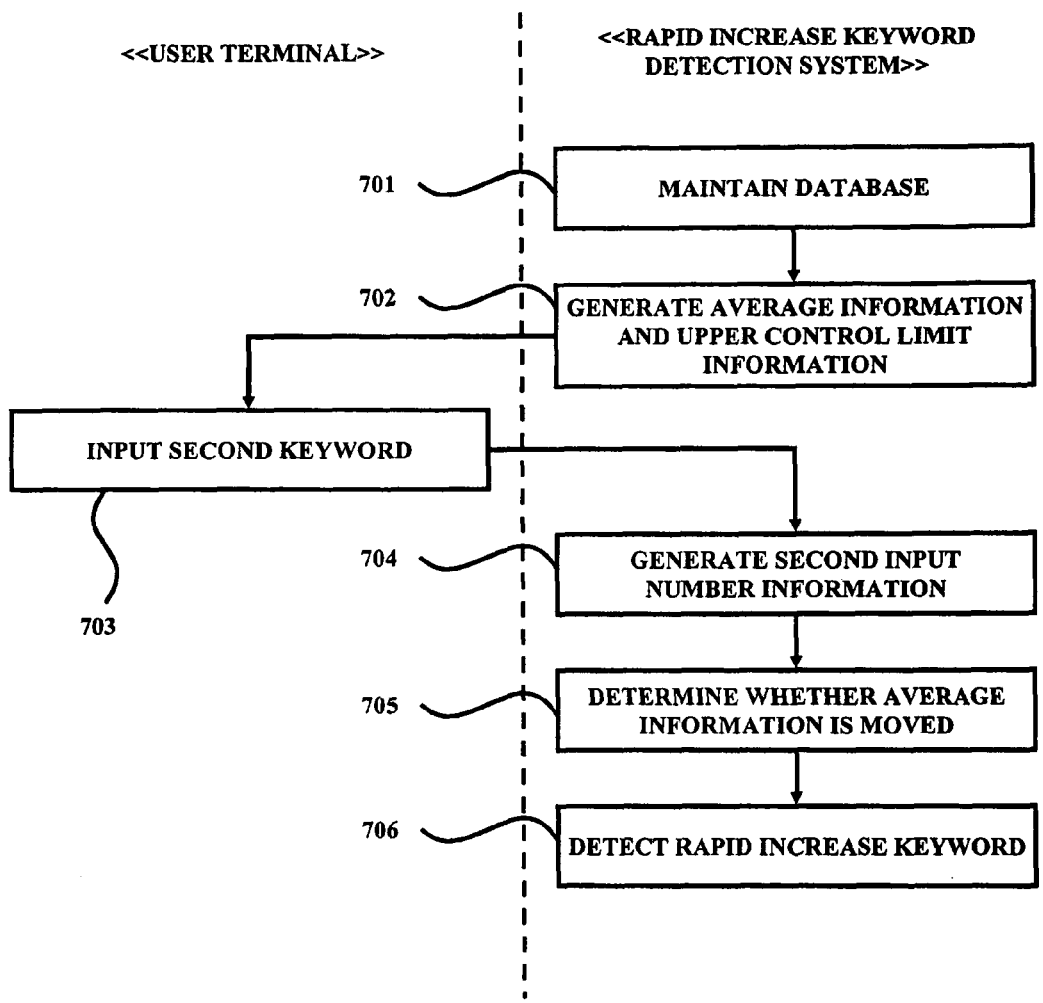
FIG. 7 is a flow chart illustrating a rapid increase keyword detection method according to still another embodiment of the present invention.

In the above, the embodiment is described, in which rapid increase keywords are detected and the priority of the detected keywords is determined. However, there may exist that an embodiment in which rapid increase keywords are detected by using the factors used for determining the priority. Hereinafter, the present embodiment is described. FIG. 6 is a flow chart illustrating a rapid increase keyword detection method according to the present embodiment.

In step 601, a rapid increase keyword detection system maintains a first database including a keyword identifier and first input number information with respect to a first keyword related to the keyword identifier. The first input number information is generated at each predetermined time interval and recorded in the first database.

In step 602, the rapid increase keyword detection system maintains a second database including keyword input rank information according to the first input number information. The keyword input rank information is generated at each the time interval and recorded in the second database.

In step 603, the rapid increase keyword detection system receives a second keyword from a user terminal. In step 604, the rapid increase keyword detection system counts the input number per the time interval for each the second keyword and generates second input number information.

In step 605, the rapid increase keyword detection system computes input number increase information related to the second input number information with reference to the first database. In step 605, the rapid increase keyword detection system searches input rank information corresponding to the second input number information with reference to the second database. In step 607, the rapid increase keyword detection system computes input rank rise information related to the input rank information with reference to the second database.

In step 608, the rapid increase keyword detection system generate average information and standard deviation information with respect to the first input number information for each the first keyword with reference to the first database. In step 609, the rapid increase keyword detection system generates standard normal variable information with respect to the second input number information by using the average information and the standard deviation information.

In step 610, the rapid increase keyword detection system generates rapid increase quotient information by using the input number increase information, the input rank information, the input rank rise information, and the standard normal variable information. In step 611, the rapid increase keyword detection system may detect a rapid increase keyword based on the rapid increase quotient information.

According to the embodiment as described above, various factors are used in order to accurately detect the rapid increase keyword. Also, the rapid rise rank information may be generated by using the rapid increase quotient information, thereby not additionally generating the rapid rise rank information.

According to an embodiment of the present invention, 1) in case that input rank rise information with respect to a keyword is higher than a predetermined figure, 2) in case that the keyword newly enters in a predetermined rank, or 3) input rank rise information with respect to a keyword is computed in a predetermined period and the input rank rise information is continuously over a predetermined figure, a method of detecting the keyword as a rapid increase keyword.

In case of 1), the rapid increase keyword detection system determines whether input rank rise information with respect to a keyword inputted by a user terminal is higher than a predetermined figure and may detect the keyword as a rapid increase keyword in case that the input rank rise information is over the figure. In this case, the figure may be changed according to the input rank of the keyword such that a rapid increase keyword whose input rank is low is rapidly increased.

In case of 2), the rapid increase keyword detection system determines whether a keyword inputted by a user terminal newly enters in a predetermined rank by using input rank information with respect to the keyword and may detect the keyword as a rapid increase keyword in case that the keyword newly enters.

In case of 3), the rapid increase keyword detection system computes input rank, rise information with respect to a keyword inputted by a user terminal for each time interval in which input number information is generated in a predetermined period, determined whether the input rank rise information is continuously over a predetermined figure in the period, and may detect the keyword as a rapid increase keyword in case that the input rank rise information is continuously over the predetermined figure. In this case, the figure may be different according to the input number of the keyword such that a rapid raise keyword whose input number is low is rapidly increased.

According to an embodiment as 1) or 2), a keyword whose input rank is rapidly elevated can be simply detected as a rapid increase keyword, thereby simplifying a process for detecting a rapid increase keyword, reducing unnecessary memory consumption, and improving the speed of the process. Also, according to an embodiment as 3), a keyword whose rank continuously rises in a predetermined period may be detected as a rapid increase keyword, thereby detecting a keyword whose input number is continuously increased instead of a keyword whose input number is temporarily increased.

According to an embodiment of the present invention, average information and upper control limit information for each keyword are generated by using an exponentially weighted moving average (EWMA) control chart and a method of detecting a rapid increase keyword by determining whether the average information moves is provided. Hereinafter, the present embodiment is described.

Generally, control charts are widely used for various purposes. The EWMA control chart is most widely used for the merit of being simply generalized and detecting a small change. In order to satisfactorily manufacture goods to fit standards in a manufacturing process of goods, it is very important to continuously monitor the quality of goods in the process of production. The EWMA control chart is generally used for solving the problem.

According to the present embodiment, the EWMA control chart is used for detecting a rapid increase keyword, thereby monitoring the tendency of the input number with respect to one of keywords according to time change.

The rapid increase keyword detection method according to the present embodiment may be shown as a statistical matter as following. First, a usual input number with respect to a keyword is assumed to be according to the normal distribution in which the average is $\mu_0$, and the distribution is $\sigma^2$. A rapid increase keyword detection system according to the present embodiment determines whether the average with respect to the keyword everyday. The determination of the rapid increase keyword detection system, in which the average is moved at a point of time, means that the interest of users, with respect to the keyword is different from previous times. The rapid increase keyword detection system may detect the keyword as a rapid increase keyword at the point of time.

The problem is solved by using the EWMA control chart as following. Considering a statistic as following at the point of time t, $$Z_t = pX_t + (1-p)Z_{t-1} \quad \text{<Equation. 1 statistic } Z_t\text{>}$$

A statistic $Z_t$ is considered a weight p is added to the input number measured at the point of time t, and a weight (1−p) is added with respect to a statistic at the point of time just before. Via this, the average movement is considered adding a lot of weight to a current measurement value. Equation 1 is expressed again as following.

$$Z_t = pX_t + p\sum_{i=1}^{t-1}(1-p)^i X_{t-i}$$

<Equation. 2 statistic $Z_t$>

On the other hand, the distribution of statistic $Z_t$ may be computed as following.

$$\text{var}(Z_t) = \sigma^2\left(\frac{p}{2-p}\right)(1-(1-p)^{2t})$$

<Equation. 3 the distribution of statistic $Z_t$>

Also, an upper control limit as following may be computed by using a general management theory.

$$UCL = \bar{x} = 3\hat{\sigma}\sqrt{\frac{p}{2-p}} = \bar{x} = 3\frac{M\bar{R}}{d_2}\sqrt{\frac{p}{2-p}}$$

<Equation. 4 an upper control limit>

In Equation. 4, $d_2$ may use 1.128 as a coefficient making $\hat{\sigma}$ as an unbiased estimator, and $M\bar{R}$ is a number averaging movement ranges. That is, it may be expressed as $$M\bar{R} = \frac{1}{t-1}\sum_{i=2}^{t} MR_i, \ MR_i = x_i - x_{i-1}.$$

According to the rapid increase keyword detection methods by using the EWMA control chart, according to the present embodiment, the rapid increase keyword detection system may determine as the average is moved in case that $Z_t$ computed at each point of time is over UCL and detect a keyword determined like this as a rapid increase keyword.

For example, in a rapid increase keyword detection methods considering present data and data 90 days before, 1) in case that the data 90 days before are $X_{-90}, X_{-89}, \ldots, X_{-1}$, and the present data is $X_1$, the rapid increase keyword detection system 2) may compute the average and upper control limit of the EWMA control chart by using the data 90 days before, and 3) when a final control chart is made, convert the present data $X_1$ is converted into $Z_t$ and check whether $Z_t$ is higher than the upper control limit to determine whether the average is moved.

Hereinafter, a rapid increase keyword detection method according to the present embodiment, based on the construction of the theory described above.

In step 701, a rapid increase keyword detection system according to the present embodiment maintains a database including a keyword identifier and first input number information with respect to a first keyword related to the keyword identifier. The first input number information is generated at each time interval and recorded in the database.

In step 702, the rapid increase keyword detection system generates average information and upper control limit information related to the first input number information for each the first keyword by using an exponentially weighted moving average (EWMA) control chart with reference to the database.

In step 703, the rapid increase keyword detection system receives a second keyword from a user terminal. In step 704, the rapid increase keyword detection system counts the input number per the time interval for each the second keyword and generates second input number information.

In step 705, the rapid increase keyword detection system determined whether the average information is moved, based on the second input number information and the upper control limit information. In case that the average information is determined to be moved, in step 706, a third keyword related to the moved average information is detected, thereby detecting a rapid increase keyword.

Also, the embodiments of the present invention include a computer readable medium including a program instruction for executing various operations realized by a computer. The computer readable medium may include a program instruction, a data file, and a data structure, separately or cooperatively. The program instructions and the media may be those specially designed and constructed for the purposes of the present invention, or they may be of the kind well known and available to those skilled in the art of computer software arts.

Figure 8:
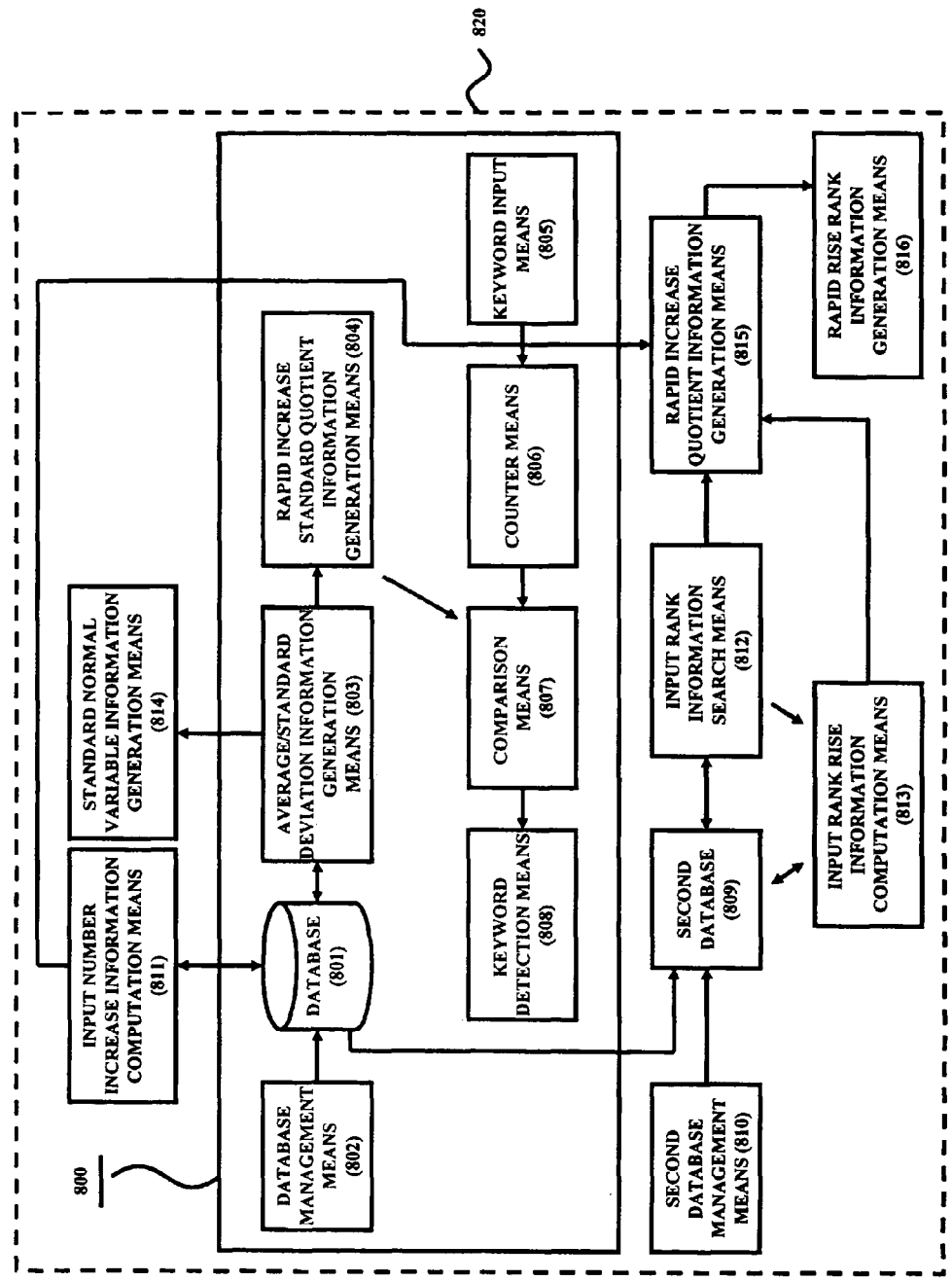
FIG. 8 is a block diagram illustrating a rapid increase keyword detection system according to yet another embodiment of the present invention.

Hereinafter, a rapid increase keyword detection system according to another embodiment of the present invention is described. FIG. 8 is a block diagram illustrating the rapid increase keyword detection system according to the present embodiment.

The rapid increase keyword detection system 800 according to the present embodiment includes a database 801, a database management means 802, an average/standard deviation information generation means 803, a rapid increase standard quotient information generation means 804, a keyword input means 805, a counter means 806, a comparison means 807, and a keyword detection means 808.

The database 801 includes a keyword identifier and first input number information with respect to a first keyword related to the keyword identifier. FIG. 3 is a diagram illustrating an example of the database 801. Since FIG. 3 is previously described in the specification, detailed description will be omitted.

The database management means 802 generates the first input number information for each predetermined time interval and records in the database 801.

The average/standard deviation information generation means 803 generates average information and standard deviation information with respect to the first input number information for each the first keyword with reference to the database 801. According to an embodiment of the present invention, the average/standard deviation information generation means 803 may not consider data at the point of time when detecting a rapid increase keyword, in generating the average information and standard deviation information for each keyword.

The rapid increase standard quotient information generation means 804 generates rapid increase standard quotient information for each the first keyword by using the average information and the standard deviation information. The rapid increase standard quotient information is a standard quotient in determining whether the input number with respect to a keyword is rapidly increased. According to an embodiment of the present invention, the rapid increase standard quotient information generation means 804 adds a value in which the standard deviation information is multiplied by a predetermined number to the average information to generate the rapid increase standard quotient information. For example, the predetermined number may be 3. In this case, the rapid increase standard quotient information may be expressed as an equation such as "average+(3*standard deviation)".

The keyword input means 805 receives a second keyword from a user terminal, and the counter means 806 counts the input number per the time interval fro each the second keyword and generates second input number information.

The comparison means 807 compares the second input number information with the rapid increase standard quotient information, and the keyword detection means 808 detects a third keyword related to third input number information higher than the rapid increase standard quotient information among the second input number information.

As described above, the rapid increase keyword detection system 800 compares a standard quotient based on previous data for each keyword with the input number at the present point of time for each the keyword, thereby detecting a keyword whose input number is rapidly increased to be higher than the standard quotient. FIG. 4 is a diagram illustrating for detecting rapid increase keywords via comparing with the rapid increase standard quotient information as described above. Since FIG. 4 is previously described in the present specification, detailed description will be omitted.

According to an embodiment of the present invention, a rapid increase keyword detection system which can generate rank information of detected rapid increase keywords is provided. Hereinafter, the present embodiment will be described.

The rapid increase keyword detection system 820 may further include a second database 809, a second database management means 810, an input number increase information computation means 811, an input rank information search means 812, an input rank rise information computation means 813, a standard normal variable information generation means 814, a rapid increase quotient information generation means 815, and a rapid rise rank information generation means 816.

The second database 809 includes keyword input rank information according to the first input number information. FIG. 5 is a diagram illustrating an example of the second database 809. Since FIG. 5 is previously described in the present specification, detailed description will be omitted.

The second database management means 810 generates the keyword input rank information at each the time interval and records in the second database 809.

The input number increase information computation means 811 computes input number increase information related to the third input number information with reference to the database 801.

The input rank information search means 812 searches input rank information corresponding to the third input number information with reference to the second database 809 and computes input rank rise information associated with the input rank information with reference to the input rank rise information computation means 813 and the second database 809.

The standard normal variable information generation means 814 generates standard normal variable information with respect to the third input number information by using the average information and the standard deviation information.

The rapid increase quotient information generation means 815 generates rapid increase quotient information by using the input number increase information, the input rank information, the input rank rise information, and the standard normal variable information.

According to an embodiment of the present invention, the rapid increase quotient information generation means 815 generates a multiplication operation value of the input number increase information, the reciprocal of the input rank information, the input rank rise information, and the standard normal variable information and may generate the rapid increase quotient information by using the multiplication operation value.

Also, according to an embodiment of the present invention, the rapid increase quotient information generation means 815 may use a method in which degree information related to the standard normal variable information is generated and the multiplication operation value is generated by using the degree information, in generating the multiplication operation value of the input number increase information, the reciprocal of the input rank information, the input rank rise information, and the standard normal variable information. In this case, the degree information may be changed according to a predetermined standard.

According to another embodiment of the present invention, the rapid increase quotient information generation means 815 may generate an addition operation value of the input number increase information, the input rank rise information, and the standard normal variable information, generate a multiplication operation value of the addition operation value and the reciprocal of the input rank information, and generate the rapid increase quotient information by using the multiplication operation value. Also, according to the present embodiment, in generating the addition operation value, the rapid increase quotient information generation means 815 may use a method in which first weight information related to the input number increase information is generated, second weight information related to the input rank rise information is generated, third weight information related to the standard normal variable information is generated, and the addition operation value is generated by using the first, second, and third weight information. In this case, the first, second, and third weight information may be changed according to a predetermined standard.

The rapid rise rank information generation means 816 may generate rapid rise rank information with respect to the third keyword base on the rapid increase quotient information.

A system manager may provide particular customization service with respect to keywords whose rapid increase degree is larger and more important by using the generated rapid rise rank information. Also, the system manager provides the generated rapid rise rank information to users, thereby satisfying the desire of the users who wonder keywords whose population is rapidly increased.

In the above, the embodiment in which rapid increase keywords are detected and the rank of the detected rapid increase keywords is determined is described. However, there may be an embodiment to detect rapid increase keywords by using factors used for determining the rank. Hereinafter, the present embodiment will be described.

A rapid increase keyword detection system according to the present embodiment may include the database 801, the database management means 802, the second database 809, the second database management means 810, the keyword input means 805, the counter means 806, the input number increase information computation means 811, the input rank information search means 812, the input rank rise information computation means 813, the average/standard deviation information generation means 803, the standard normal variable information generation means 814, the rapid increase quotient information generation means 815, and the keyword detection means 808.

In the present embodiment, the keyword detection means 808 detects rapid increase keywords, based on the rapid increase quotient information generated by the rapid increase quotient information generation means 815.

According to the embodiment as described above, the rapid increase keywords may be accurately detected by using various factors. Also, since the rapid rise rank information may be generated by using the rapid increase quotient information, the rapid rise rank information may not be additionally generated.

According to an embodiment of the present invention, a system is provided, for detecting the keyword as a rapid increase keyword 1) in case that input rank rise information with respect to a keyword is higher than a predetermined quotient, 2) a keyword newly enters in a predetermined rank according to input rank with respect to the keyword, or 3) input rank rise information with respect to a keyword is computed in a predetermined period and the input rank rise information is continuously higher than a predetermined quotient in the period.

In case of 1), the rapid increase keyword detection system may include a determination means (not shown) determining whether the input rank rise information with respect to the keyword inputted by a user terminal is higher than a predetermined quotient. Also, in case of 2), the rapid increase keyword detection system may include a determination means (not shown) determining whether the keyword newly enters in a predetermined rank by using the input rank information with respect to the keyword inputted by a user terminal.

On the other hand, in case of 3), the rapid increase keyword detection system may include the input rank rise information computation means 813 computing the input rank rise information with respect to a keyword at each time interval when the input number information is generated in a predetermined period with reference to the second database 809 and a determination means (not shown) determining whether the input rank rise information is continuously higher than a predetermined quotient in the period.

According to embodiments as 1) or 2), a keyword whose input rank is rapidly elevated is simply detected as the rapid increase keyword, thereby simplifying a process of detecting the rapid increase keyword. Therefore, unnecessary memory consumption can be reduced, and the speed of the process is improved. Also, according to an embodiment as 3), a keyword whose rank continuously rises in a predetermined period may be detected as the rapid increase keyword, thereby detecting a keyword whose input number is continuously increased, not a keyword whose input number is temporarily increased.

Figure 9:
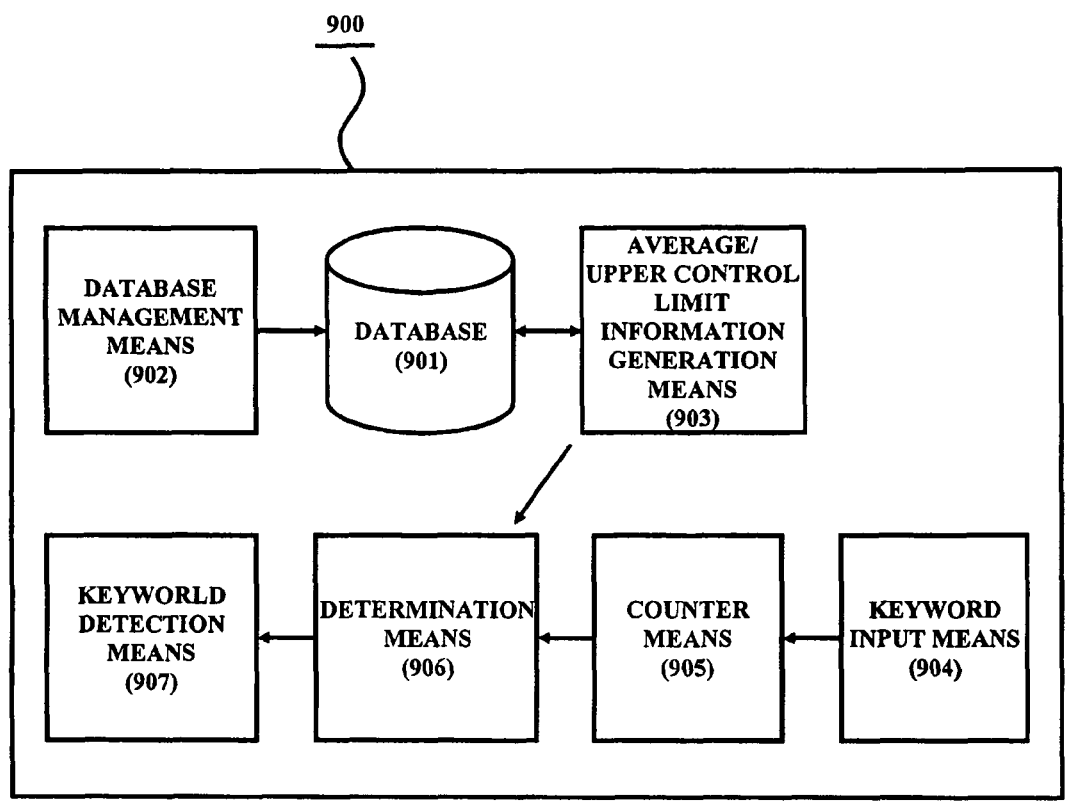
FIG. 9 is a block diagram illustrating a rapid increase keyword detection system according to a further embodiment of the present invention.

According to an embodiment of the present invention, a system is provided, which can generate average information and upper control limit information by using an exponentially weighted moving average (EWMA) control chart and detect a rapid increase keyword by determining whether the average information is moved. FIG. 9 is a block diagram illustrating a rapid increase keyword detection system according to the present embodiment.

The rapid increase keyword detection system 900 according to the present embodiment may include a database 901, a database management means 902, an average/upper control limit information generation means 903, a keyword input means 904, a counter means 905, a determination means 906, and a keyword detection means 907.

The database 901 includes a keyword identifier and first input number information with respect to a first keyword related to the keyword identifier. The database management means 902 generates the first input number information at each time interval and records in the database 901.

The average/upper control limit information generation means 903 generates average information and upper control limit information related to the first input number information for each the first keyword by using an exponentially weighted moving average (EWMA) control chart, with reference to the database 901.

The keyword input means 904 receives a second keyword from a user terminal. The counter means 905 counts the input number per the time interval for each second keyword and generates second input number information.

The determination means 906 determines whether the average information is moved, based on the second input number information and the upper control limit. In case that the average information is determined to be moved, the keyword detection means 907 detects a third keyword related to the moved average information. Therefore, a rapid increase keyword may be detected.

The rapid increase keyword detection system according to the present invention may be usefully used in various fields.

For example, when a rapid increase keyword is detected, a search service manager may designate the keyword as a keyword for sale in order to performing a keyword advertisement sale via a predetermined keyword shop. In this case, the service manager widens the area designating the rapid increase keyword as the keyword for sale, thereby raising advertising profits and, in case that a keyword is already in sale, raising the price. Therefore, profits may be maximized.

Also, the rapid increase keyword detection method and system according to the present invention may be applied to shopping mall. For example, a shopping mall manager detects goods whose sale is rapidly increased and insets the introduction of the goods the front page of the shopping mall homepage, thereby maximizing the profit. In this case, the rapid increase keyword detection method may be applied to a method of detecting the goods whose sale is rapidly increased.

Also, a season type keyword may be extracted by analyzing keyword log data over several years by using the rapid increase keyword detection method and system according to the present invention. For example, a search service manager extracts a keyword whose search request number is rapidly increased in a certain period, determines the popular period for each keyword, controls the sale price of the keyword just before the period, and builds up the promotion with respect to the popular keyword. Therefore, the profit may be maximized.

In addition to the described above, the rapid increase keyword detection method and system may be applied to various fields for useful purpose.

Figure 10:
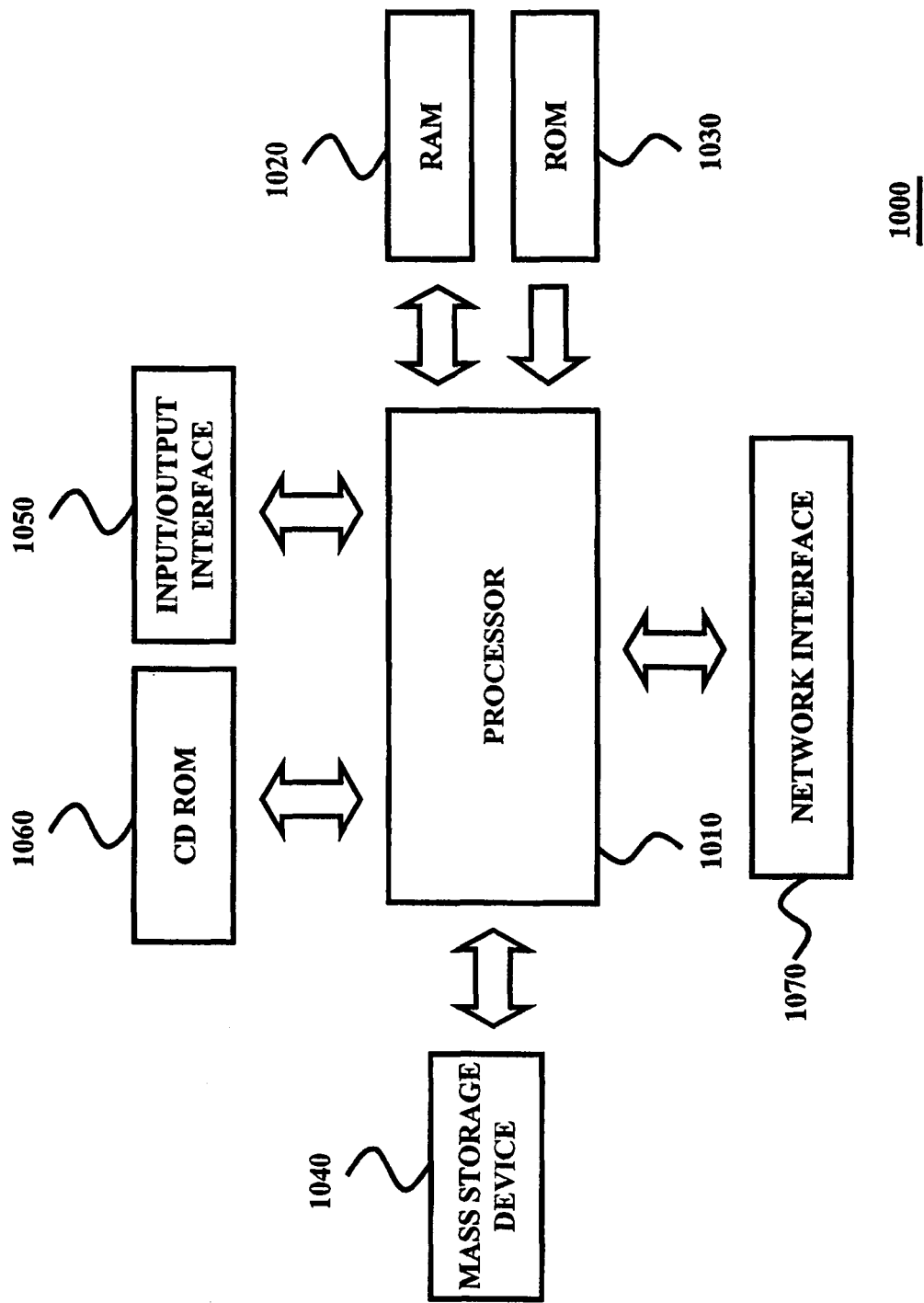
FIG. 10 is a block diagram of the inside of a general use computer apparatus which can be employed to perform the rapid increase keyword detection method according to the present invention.

FIG. 10 is a block diagram of the inside of a general use computer apparatus which can be applied to perform the rapid increase keyword detection method according to the present invention.

A computer apparatus 1000 includes at least one processor 1010 connected to a main memory device including a RAM (Random Access Memory) 1020 and a ROM (Read Only Memory) 1030. The processor 1010 is also called as a central processing unit CPU. As well-known to the field of the art, the ROM 1030 unidirectionally transmits data and instructions to the CPU, and the RAM 1020 is generally used for bidirectionally transmitting data and instructions. The RAM 1020 and the ROM 1030 may include a certain proper form of a computer readable recording medium. A mass storage device 1040 is bidirectionally connected to the processor 1010 to provide additional data storage capacity and may be one of the computer readable recording medium. The mass storage device 1040 is used for storing programs and data and is an auxiliary memory. A particular mass storage device such as a CD ROM 1060 may be used. The processor 1010 is connected to at least one input/output interface 150 such as a video monitor, a track ball, a mouse, a keyboard, a microphone, a touch-screen type display, a card reader, a magnetic or paper tape reader, a voice or hand-writing recognizer, a joy stick, and other known computer input/output unit.

The processor 1010 may be connected to a wired or wireless communication network via a network interface 1070. The procedure of the described method can be performed via the network connection. The described devices and tools are well-known to those skilled in the art of computer hardware and software.

The described hardware devices may be formed to be operated by at least one software module in order to perform the operations of the present invention While this invention has been particularly shown and described with reference to preferred embodiments thereof, various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

INDUSTRIAL APPLICABILITY

According to the rapid increase keyword detection method and system according to the present invention, a rapid increase standard quotient is generated by using the average and standard deviation for each keyword and a keyword whose input number is rapidly increased is detected by comparing the rapid increase standard quotient with a measured input number, thereby providing the customization service with respect to the rapid increase keyword to a user.

Also, according to the rapid increase keyword detection method and system according to the present invention, a keyword whose the number of being inputted by users is rapidly detected and provided to a user, thereby satisfying the requirement of the user who wants to quickly receive the result of search using a keyword whose population is rapidly increased.

Also, according to the rapid increase keyword detection method and system according to the present invention, a keyword whose the number of being inputted by users is rapidly detected and provided to a user, thereby applying the detected rapid increase keyword to various fields to maximize the profit of Internet search service providers.

Also, according to the rapid increase keyword detection method and system according to the present invention, a rapid increase keyword is detected by colligating data accumulated over all fields in a certain period, thereby satisfying the requirement of users who want to receive the rapid increase keyword that is more accurate and is over various fields.

The invention claimed is:

1. A method that utilizes a processor to detect a rapid increase keyword, the method comprising:
   generating, using the processor, rapid increase standard quotient information comprising an input number threshold to detect a rapid increase keyword by using input number information for a keyword, the input number information being related to a first number of inputs of the keyword as a search term by users for time intervals;
   generating subsequent input number information for the keyword based on a second number of inputs of the keyword as a search term by users for a subsequent time interval;
   comparing the subsequent input number information with the rapid increase standard quotient information to determine whether the second number of inputs exceeds the input number threshold of the rapid increase standard quotient information;
   generating input rank rise information by calculating a difference in ranks for the keyword in terms of input numbers for a time interval; and
   identifying the keyword as a rapid increase keyword based on a determination that the second number of inputs exceeds the input number threshold and based on a rapid increase quotient obtained by applying a weight variable to at least one piece of the input number increase information, the input rank rise information and the rapid increase standard quotient information.

2. The method of claim 1, wherein the generating the rapid increase standard quotient information comprises generating the rapid increase standard quotient information using statistical information based on the first number of inputs.

3. The method of claim 1, further comprising:
   recording input number rank information based on the first number of inputs;
   generating input number increase information based on the second number of inputs; and
   determining input rank information for the keyword corresponding to the input number increase information using the input number rank information and computing input rank rise information using the input number rank information and the input rank information.

4. The method of claim 3, further comprising:
generating statistical information associated with the input number information;
generating rapid increase quotient information by using one piece of the input number increase information, the input number rank information, the input rank rise information, or the statistical information associated with the input number information; and
generating rapid rise rank information related to the keyword based on the rapid increase quotient information.

5. The method of claim 1, further comprising:
generating input number rank information according to the first number of inputs and recording the input number rank information;
computing input number increase information based on the first number of inputs and the second number of inputs; and
computing input rank rise information using the input number rank information and the input number increase information,
wherein the identifying the keyword as a rapid increase keyword comprises using the rapid increase standard quotient information based on at least one piece of the input number increase information, the input number rank information, and the input rank rise information.

6. The method of claim 5, further comprising:
generating statistical information related to the input number information; and
generating statistical information related to the subsequent input number information using the statistical information related to the input number information,
wherein the identifying the keyword as the rapid increase keyword comprises using at least one piece of the input number increase information, the input rank information, the input rank rise information, and the statistical information associated with the subsequent input number information.

7. The method of claim 6, wherein the identifying the keyword as the rapid increase keyword comprises applying a weight variable to the input number increase information, the input rank information, the input rank rise information, and the statistical information related to the subsequent input number information.

8. A method for detecting a rapid increase keyword, the method comprising:
maintaining a database to store a keyword identifier and input number information comprising a first number of inputs received from users with respect to a keyword related to the keyword identifier for time intervals;
generating average input number information and threshold input number information associated with the input number information corresponding to the keyword by using exponentially weighted moving average (EWMA);
receiving a second number of inputs for the keyword as a search term from user terminals for a subsequent time interval;
counting the second number of inputs to determine whether the second number of inputs exceeds the threshold input number information;
generating input rank rise information by calculating a difference in ranks for the keyword in terms of input numbers for a time interval;
generating input number increase information depending on whether the average information is moved based on the input number information and the threshold input number information; and
identifying the keyword as a rapid increase keyword based on a determination that the second number of inputs exceeds the threshold input number information and based on a quotient obtained by applying a weight variable to at least one piece of the input number increase information, the input rank rise information and the average information.

9. A non-transitory computer readable recording medium comprising an executable program that, when executed, performs the steps of:
generating rapid increase standard quotient information comprising a input number threshold by using input number information for a keyword, the input number information comprising a first number of inputs of the keyword as a search term by users for time intervals;
receiving a second number of inputs of the keyword for a subsequent time interval to generate subsequent input number information for the keyword;
comparing the subsequent input number information with the rapid increase standard quotient information to determine whether the second number of inputs exceeds a input number threshold of the rapid increase standard quotient;
generating input rank rise information by calculating a difference in ranks for the keyword in terms of input numbers for a time interval; and
identifying the keyword as a rapid increase keyword based on a determination that the second number of inputs exceeds the input number threshold and based on a rapid increase quotient obtained by applying a weight variable to at least one piece of the input number increase information, the input rank rise information and the rapid increase standard quotient information.

10. A system implementing a processor to detect a rapid increase keyword, the system comprising:
an input number information recording unit using the processor to receive input number information comprising a first number of inputs from users with respect to a keyword as a search term for time intervals, to receive subsequent input number information comprising a second number of inputs with respect to the keyword for a subsequent time interval, and to record the input number information and the subsequent input number information;
a rapid increase standard quotient information generating unit using the processor to generate rapid increase standard quotient information associated with the keyword by using the received input number information;
a counting unit using the processor to compare the received subsequent input number information with the rapid increase standard quotient information to determine whether the keyword with respect to the received subsequent input number information is the rapid increase keyword, wherein input rank rise information for the keyword is generated by calculating a difference in ranks for the keyword in terms of input numbers for a time interval; and
a keyword detecting unit using the processor to determine a rapid increase keyword based on a determination that the second number of inputs exceeds an input number threshold of the rapid increase standard quotient information and based on a rapid increase quotient obtained by applying a weight variable to at least one piece of the input number increase information, the input rank rise information and the rapid increase standard quotient information.

11. The system of claim 10, further comprising:

a statistical information generating unit causing the processor to generate statistical information related to the input number information, wherein the rapid increase standard quotient information generating unit causes the processor to generate the rapid increase standard quotient information using the statistical information related to the input number information.

12. The system of claim 10, further comprising:

a statistical information generating unit causing the processor to generate statistical information associated with the input number information, wherein the rapid increase standard quotient information generating unit is configured to generate the rapid increase standard quotient information using the statistical information associated with the input number information;

a input number rank information recording unit causing the processor to generate input number rank information according to the first number of inputs and to record the generated input number rank information;

a input number increase information computing unit causing the processor to compute input number increase information associated with the second number of inputs with reference to the first number of inputs;

an input rank information searching unit causing the processor to determine input rank information corresponding to the second number of inputs with reference to the first input number rank information; and an input rank rise information computing unit causing the processor to compute input rank rise information using the input number rank information and the input rank information.

13. The system of claim 12, further comprising:

a input number rank information recording unit causing the processor to generate the input number rank information according to the input number information and to record the input number rank information;

a input number increase information computing unit causing the processor to compute input number increase information based on the second number of inputs and the input number information;

an input rank rise information computing unit causing the processor to compute the input rank rise information using the input number increase information; and a keyword detecting unit causing the processor to detect a rapid increase keyword by using rapid increase quotient information based on one of the input number increase information, the input number rank information, or the input rank rise information.

14. The system of claim 13, wherein the keyword detecting unit comprises:

a first statistical information generating unit causing the processor to generate statistical information associated with the input number information;

a second statistical information generating unit causing the processor to generate statistical information associated with the subsequent input number information by using the statistical information related to the first input number information; and a rapid increase quotient information generating unit causing the processor to generate rapid increase quotient information by using one piece of the input number increase information, the input number rank information, the input rank rise information, or the statistical information associated with the subsequent input number information.

15. The system of claim 12, further comprising:

a statistical information generating unit causing the processor to generate statistical information related to the subsequent input number information by using the statistical information associated with the input number information;

a rapid increase quotient information generating unit causing the processor to generate rapid increase quotient information by using one piece of the input number increase information, the input number rank information, the input rank rise information, or the statistical information related to the subsequent input number information; and a rapid rise rank information generating unit causing the processor to generate rapid rise rank information associated with the keyword based on the rapid increase quotient information.

* * * * *